(12) United States Patent
Park

(10) Patent No.: US 10,114,228 B2
(45) Date of Patent: Oct. 30, 2018

(54) LENS MOVING APPARATUS

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 161 days.

(21) Appl. No.: 14/944,571

(22) Filed: Nov. 18, 2015

(65) Prior Publication Data

US 2016/0139426 A1 May 19, 2016

(30) Foreign Application Priority Data

Nov. 18, 2014 (KR) ........................ 10-2014-0160622

(51) Int. Cl.
*G02B 27/64* (2006.01)
*G03B 5/02* (2006.01)
*G03B 5/04* (2006.01)
*G02B 7/08* (2006.01)
*G03B 3/10* (2006.01)

(52) U.S. Cl.
CPC ............. *G02B 27/646* (2013.01); *G02B 7/08* (2013.01); *G03B 3/10* (2013.01); *G03B 5/02* (2013.01); *G03B 5/04* (2013.01); *G03B 2205/0015* (2013.01); *G03B 2205/0069* (2013.01)

(58) Field of Classification Search
CPC ........ G02B 27/646; G02B 27/64; G02B 7/08; G02B 7/02; G03B 5/00; G03B 5/02; G03B 2205/0015; G03B 2205/0069; G03B 17/02; G03B 3/10; H04N 5/2257; H04N 5/23287; H04N 5/2254
USPC .......................................... 359/557, 811, 824
See application file for complete search history.

(56) References Cited

U.S. PATENT DOCUMENTS

| | | | | |
|---|---|---|---|---|
| 9,442,348 | B2 * | 9/2016 | Nishimura | G03B 17/14 |
| 2011/0279899 | A1 * | 11/2011 | Motoike | G03B 5/00 359/557 |
| 2016/0054578 | A1 * | 2/2016 | Dong | G02B 27/646 359/557 |
| 2016/0170229 | A1 * | 6/2016 | Park | H04N 5/2257 359/557 |
| 2016/0178923 | A1 * | 6/2016 | Hayashi | G02B 7/04 359/557 |

* cited by examiner

*Primary Examiner* — Collin X Beatty
(74) *Attorney, Agent, or Firm* — Saliwanchik, Lloyd & Eisenschenk

(57) ABSTRACT

A lens moving apparatus includes a bobbin of which a first coil is provided, a first magnet disposed to face the first coil, a housing for supporting the first magnet, a second coil disposed under the housing so as to face the first magnet, a printed circuit board on which the second coil is mounted, a base on which the printed circuit board is mounted, and a yoke disposed between the printed circuit board and the base.

19 Claims, 9 Drawing Sheets

[FIG. 1]
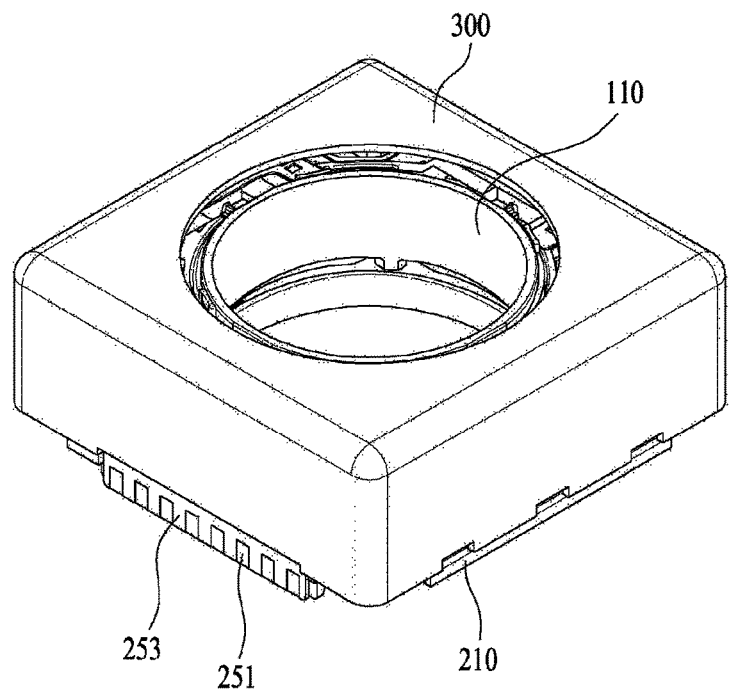

[FIG. 2]
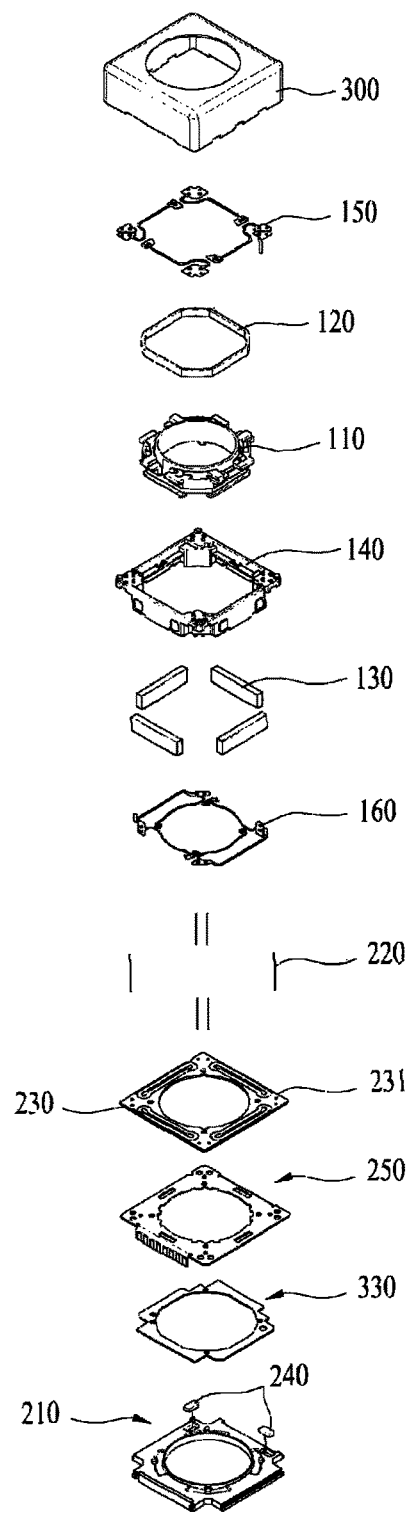

[FIG. 3]
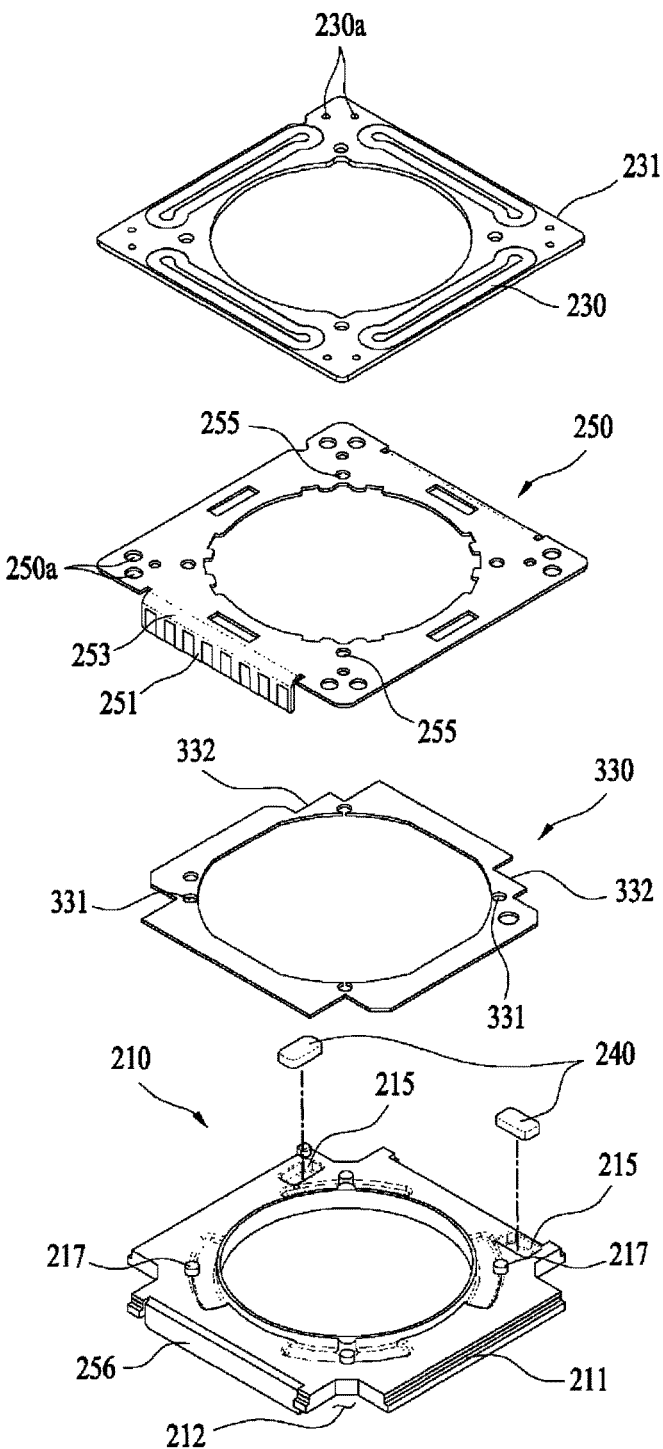

[FIG. 4]
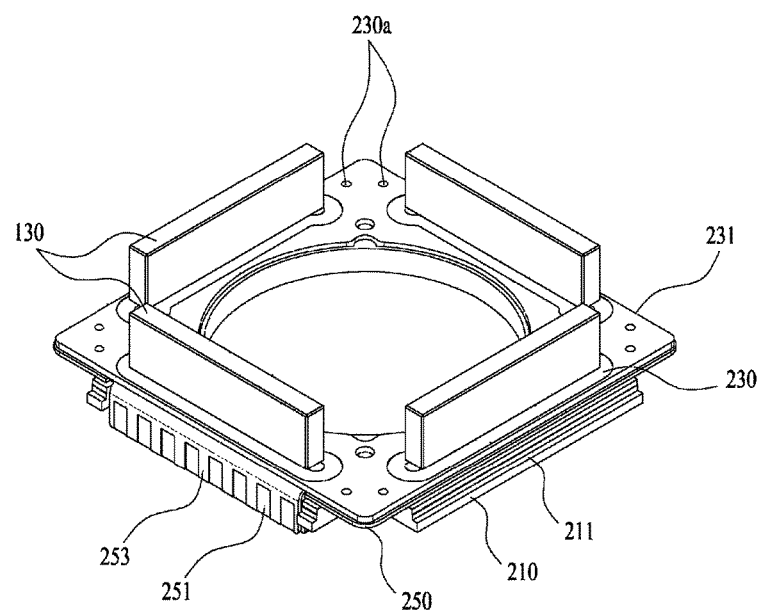
[FIG. 5]
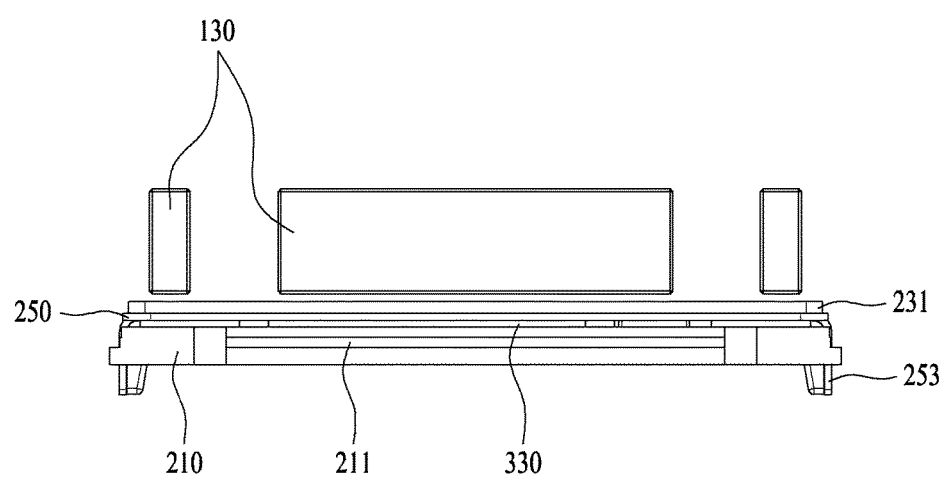

【FIG. 6】
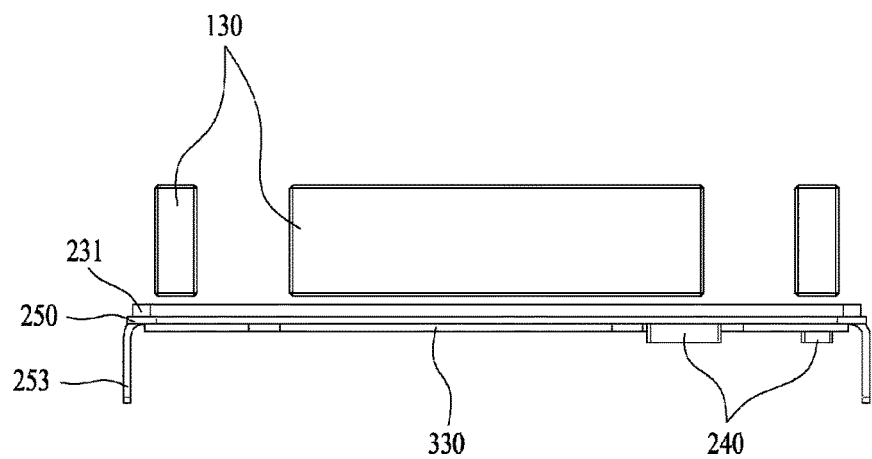
【FIG. 7】
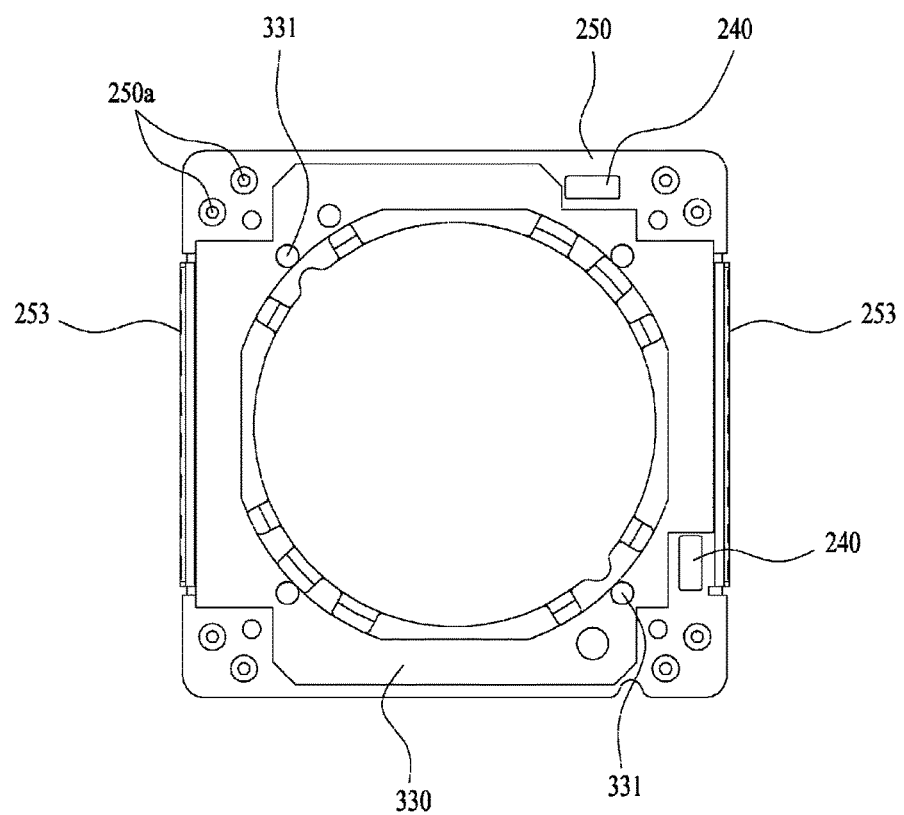

[FIG. 8]
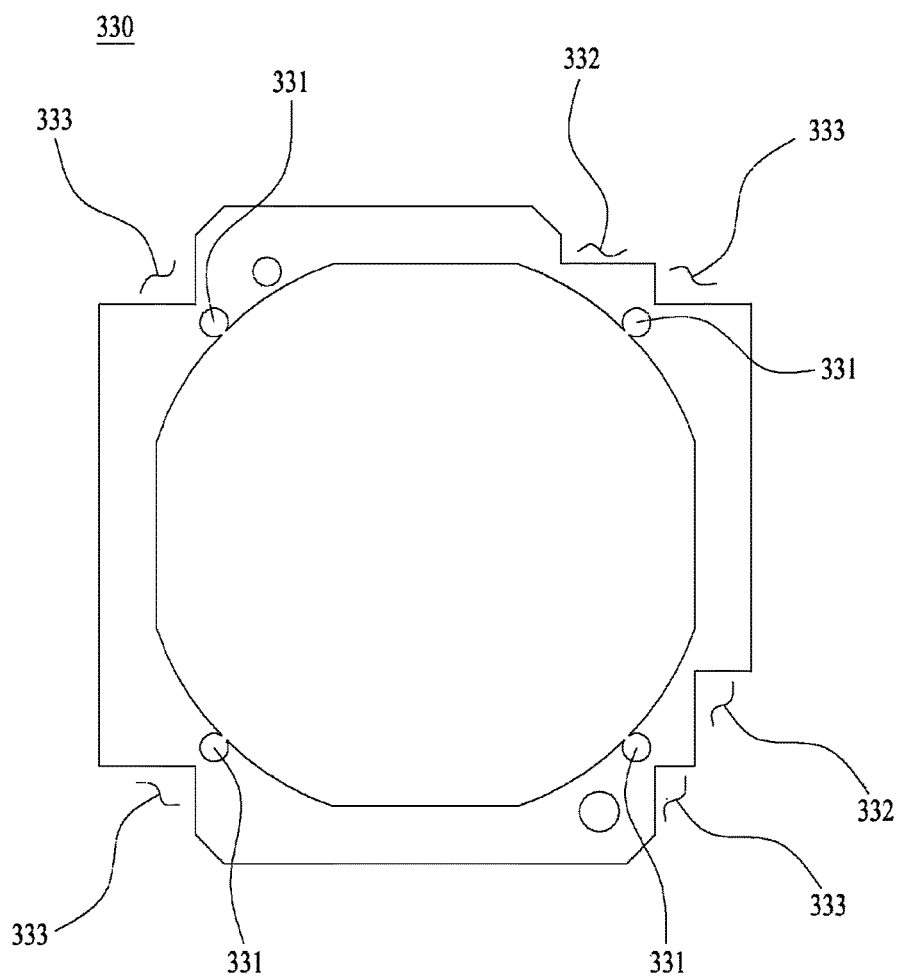

[FIG. 9]
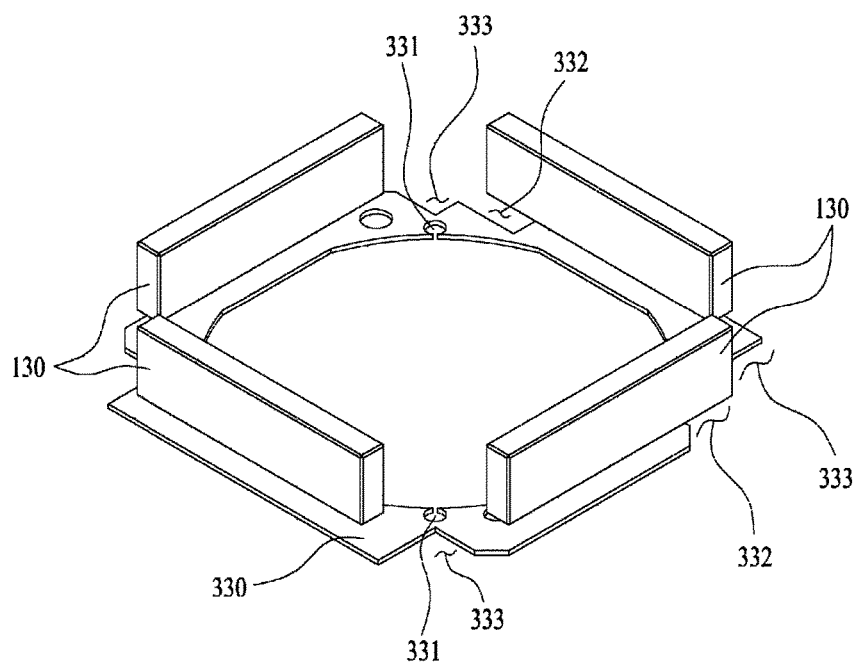

【FIG. 10】
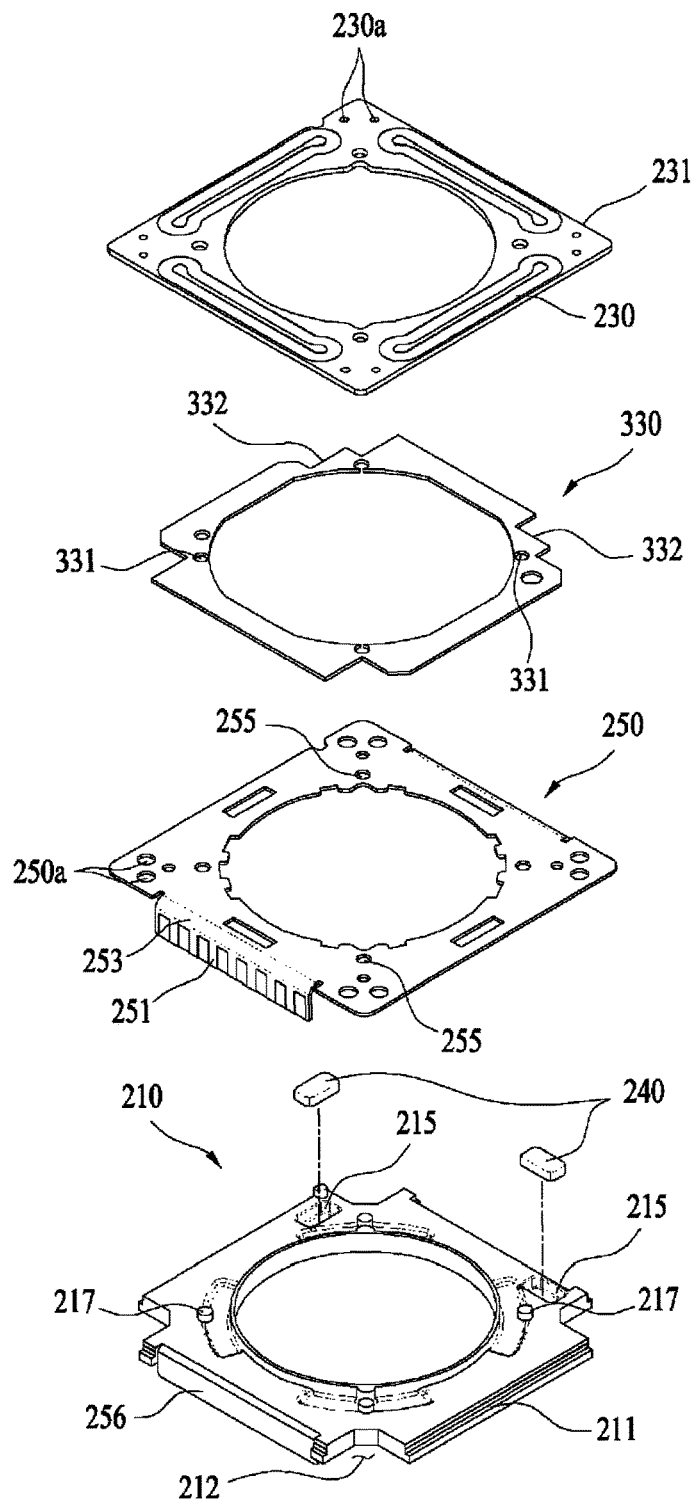

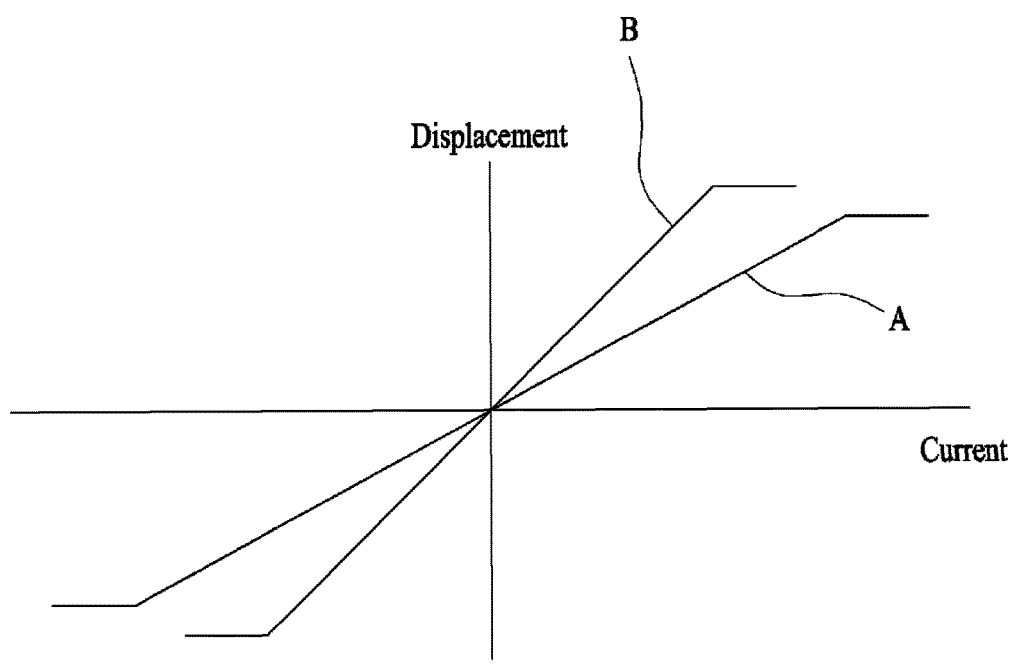
[FIG. 11]

LENS MOVING APPARATUS

CROSS REFERENCE TO RELATED APPLICATION

This application claims priority under 35 U.S.C. § 119 to Korean Application No. 10-2014-0160622, filed on Nov. 18, 2014, which is hereby incorporated by reference in its entirety.

TECHNICAL FIELD

Embodiments relate to a lens moving apparatus.

BACKGROUND

The matters disclosed in this section are intended to merely provide background information of the embodiments, and do not constitute a related art.

Recently, information technology products such as cellular phones, smart phones, tablet PCs and notebook PCs, in which ultracompact digital cameras are incorporated, are being actively developed.

A camera module mounted in a small-sized electronic product, such as a smart phone, may be frequently subjected to shocks during use. In addition, the camera module may minutely shake due to the trembling of the user's hand while taking a photograph. Therefore, considering these problems, there is a high necessity for a technology capable of additionally incorporating an optical image stabilizer into the camera module.

Recently, various handshake correction technologies have been researched. Among such technologies, there is a technology of correcting handshake by moving an optical module in the x-axis and y-axis directions, which define a plane perpendicular to the optical axis. The technology is required to accurately and quickly move and adjust the optical system in the plane perpendicular to the optical axis for image correction.

A handshake correction technology may employ a magnetic field generated by a magnet incorporated in a camera module. Here, there is a need for a technology capable of employing stronger magnetic force for the handshake correction technology without allowing the magnetic field to leak outwards.

BRIEF SUMMARY

Accordingly, embodiments provide a lens moving apparatus, which is capable of employing stronger magnetic force in the handshake correction technology without while preventing outward leakage of a magnetic field, and a camera module including the same.

In one embodiment, a lens moving apparatus includes a bobbin of which a first coil is provided, a first magnet disposed to face the first coil, a housing for supporting the first magnet, a second coil disposed under the housing so as to face the first magnet, a printed circuit board on which the second coil is mounted, a base on which the printed circuit board is mounted, and a yoke disposed between the printed circuit board and the base.

In another embodiment, a lens moving apparatus includes a bobbin of which a first coil is provided, a first magnet disposed to face the first coil, a housing for supporting the first magnet, a second coil disposed under the housing so as to face the first magnet, a printed circuit board on which the second coil is mounted, a base on which the printed circuit board is mounted, a position sensor coupled to the base so as to detect displacement of the housing in second and third directions, and a yoke disposed between the printed circuit board and the base.

In a further embodiment, a lens moving apparatus includes a bobbin of which a first coil is provided, a first magnet disposed to face the first coil, a housing for supporting the first magnet, a second coil disposed under the housing so as to face the first magnet, a printed circuit board on which the second coil is mounted, a base on which the printed circuit board is mounted, and a yoke disposed between the printed circuit board and the base so as to prevent a magnetic field generated by the first magnet from leaking outward, wherein the base includes a plurality of coupling protrusions formed on the upper surface thereof, to which the yoke and the printed circuit board are coupled.

BRIEF DESCRIPTION OF THE DRAWINGS

Arrangements and embodiments may be described in detail with reference to the following drawings in which like reference numerals refer to like elements and wherein:

FIG. 1 is a perspective view showing a lens moving apparatus according to an embodiment of the present invention;

FIG. 2 is an exploded perspective view showing the lens moving apparatus according to the embodiment;

FIG. 3 is an exploded perspective view showing disposition of a base, a yoke, a printed circuit board and second coils of the lens moving apparatus according to the embodiment;

FIG. 4 is a perspective view showing a portion of the lens moving apparatus according to the embodiment;

FIG. 5 is a side elevation view of FIG. 4;

FIG. 6 is a side elevation view of FIG. 5, from which the base is removed;

FIG. 7 is a bottom view showing a portion of the lens moving apparatus according to an embodiment of the present invention;

FIG. 8 is a bottom view showing the yoke according to an embodiment of the present invention;

FIG. 9 is a perspective view showing the first magnets and the yoke, which are configured according to an embodiment of the present invention;

FIG. 10 is an exploded perspective view showing the disposition of the base, the yoke, the printed circuit board and the second coils of the lens moving apparatus according to another embodiment of the present invention; and FIG. 11 is a graph illustrating the operating characteristics of the lens moving apparatus according to the embodiment.

DETAILED DESCRIPTION

Hereinafter, embodiments will be described with reference to the attached drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper rate.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

FIG. 1 is a perspective view showing a lens moving apparatus according to an embodiment of the present invention. FIG. 2 is an exploded perspective view showing the lens moving apparatus according to the embodiment.

An optical image stabilizing apparatus, which is applied to compact camera modules of mobile devices such as smart phones or tablet PCs, refers to an apparatus configured to prevent the contour of an image, captured when taking a still image, from not being clearly formed due to vibrations caused by the trembling of the user's hand. In addition, an autofocusing apparatus is configured to automatically focus the subject image on the surface of an image sensor (not shown). The optical image stabilizing apparatus and the autofocusing apparatus may be configured in various manners. In the embodiments, the lens moving apparatus may perform the optical image stabilizing and/or autofocusing operations in such a manner as to move an optical module, composed of a plurality of lenses, in a first direction or in a plane perpendicular to the first direction.

As shown in FIGS. 1 and 2, the lens moving apparatus according to an embodiment may include a movable unit. The movable unit may fulfill the functions of autofocusing and handshake correction for a lens. The movable unit may include a bobbin 110, a first coil 120, a first magnet 130, first magnets 130, a housing 140, an upper elastic member 150 and a lower elastic member 160.

The bobbin 110 may be accommodated in the housing 140. The first coil 120, which is disposed in the first magnets 130, may be provided on the outer surface of the bobbin 110. The bobbin 110 may be mounted so as to be reciprocated in a first direction in the internal space of the housing 140 by electromagnetic interaction between the first magnets 130 and the first coil 120. The first coil 120 may be provided on the outer surface of the bobbin 110 so as to electromagnetically interact with the first magnets 130.

The bobbin 110 may be moved in the first direction while being elastically supported by the upper and lower elastic members 150 and 160, thereby fulfilling the autofocusing function.

The bobbin 110 may include a lens barrel (not shown) into which at least one lens is mounted. The lens barrel may be internally coupled to the bobbin 110 in various manners.

In an example, the bobbin 110 may be provided on the inner surface thereof with a female threaded portion, and the lens barrel may be provided on the outer surface thereof with a male threaded portion corresponding to the female threaded portion, whereby the lens barrel may be coupled to the bobbin 110 by means of threaded engagement therebetween. However, the coupling between the lens barrel and the bobbin 110 is not limited thereto, and the lens barrel may be directly coupled to the inside of the bobbin 110 in a way other than the threaded engagement, without providing the female threaded portion on the inner surface of the bobbin 110. Alternatively, one or more lenses may be integrally formed with the bobbin 110 without using the lens barrel.

The lens, which is coupled to the lens barrel, may be composed of a single lens, or two or more lenses constituting an optical system.

The autofocusing function may be controlled by changing the direction of current, or may be fulfilled by the action of moving the bobbin 110 in the first direction. For example, the bobbin 110 may be moved upward from its initial position upon the application of forward current, and may be moved downward upon the application of reverse current. The distance by which the bobbin 110 moves in one direction from the initial position may be increased or decreased by controlling the amount of current flowing in one direction.

The bobbin 110 may be provided on upper and lower surfaces thereof with a plurality of upper support protrusions and a plurality of lower support protrusions, respectively. The upper support protrusions may be configured to have a circular cylindrical shape or a rectangular column shape, and may serve to couple or secure the upper elastic member 150 thereto. The lower support protrusions may also be configured to have a circular cylindrical shape or a rectangular column shape, and may serve to couple or secure the lower elastic member 160 thereto, like the upper support protrusions.

The upper elastic member 150 may have through holes corresponding to the upper support protrusions, and the lower elastic member 160 may have through holes corresponding to the lower support protrusions. The respective support protrusions and the corresponding through holes may be fixedly coupled to each other by means of thermal fusion or an adhesive such as epoxy.

The housing 140 may be configured to have a hollow column, for example, an approximately rectangular hollow column capable of supporting the first magnets 130. Each lateral side of the housing 140 may be provided with the first magnet 130 and support members 220 secured thereto. As described above, the bobbin 110 may be disposed on the inner surface of the housing 140, and may be guided and moved in the first direction by the housing 140.

The housing 140 may be provided with a first sensor capable of detecting a displacement of the bobbin 110 in the first direction. The bobbin 110 may be correspondingly provided with a second detecting magnet, which faces the first sensor. The first sensor may be a sensor for detecting variation in the magnetic force generated by the second magnet.

The first sensor may be provided on the bobbin 110 such that it faces the first magnets 130 so as to detect variation in the magnetic force generated by the first magnets 110. In this case, the additional second magnet may be obviated.

Each of the upper and lower elastic members 150 and 160 may be coupled to both the housing 140 and the bobbin 110, and the upper elastic member 150 and the lower elastic member 160 may elastically support the upward and/or downward movement in the first direction of the bobbin 110. The upper elastic member 150 and the lower elastic member 160 may be constituted by a leaf spring.

As shown in FIG. 2, the upper elastic member 150 may be composed of a plurality of elastic members, which are separated from each other. By virtue of the multiple partitioning structure, current having different polarities or different electric powers may be applied to the respective elastic members of the upper elastic member 150. The lower elastic member 160 may also be composed of a plurality of elastic members, and may be conductively connected to the upper elastic member 150.

The upper elastic member 150, the lower elastic member 160, the bobbin 110 and the housing 140 may be assembled to one another by means of thermal fusion and/or bonding using an adhesive or the like. In some assembly sequences, the assembly may be implemented in the sequence of thermal fusion followed by bonding using an adhesive.

The base 210 may be disposed under the bobbin 110, and may be configured to have an approximately rectangular shape. A printed circuit board 250 may be mounted on the base 210.

The regions of the base 210 that face terminal members 253 of the printed circuit board 250 may be provided with respective support recesses having a size corresponding to that of the terminal members 253. The support recesses may be recessed from the outer circumferential surfaces of the base 210 by a predetermined depth such that the terminal members 253 do not protrude outward from the outer circumferential surface of the base 210 or such that the extent to which the terminal members 253 protrude can be controlled.

The support members 220 are disposed on the lateral sides of the housing 140 such that the upper sides of the support members 220 are coupled to the housing 140 and the lower sides of the support members 220 are coupled to the base 210. The support members 220 may support the bobbin 110 and the housing 140 in such a manner as to allow the bobbin 110 and the housing 140 to move in the second and third directions, perpendicular to the first direction. The support members 220 may be conductively connected to the first coil 120.

Since the support members 220 according to the embodiment are disposed two on the outer surface of each corner of the housing 140, a total of eight support members 220 may be disposed. The support members 220 may be conductively connected to the upper elastic member 150. Specifically, the support members 220 may be conductively connected to regions around the through holes.

Since the support members 220 are made of a material different from that of the upper elastic member 150, the support members 220 may be conductively connected to the upper elastic member 150 by means of a conductive adhesive, solder or the like. Consequently, the upper elastic member 150 may apply current to the first coil 120 through the support members 220 conductively connected thereto.

Although the support members 220 are illustrated in FIG. 2 as being embodied as linear support members according to an embodiment, the support members 220 are not limited thereto. In other words, the support members 220 may be configured to have a plate shape or the like.

Second coils 230 may move the housing 140 in the second and/or third directions to perform the handshake correction by virtue of electromagnetic interaction with the first magnets 130. Accordingly, the first magnets 130 are required to be disposed at positions corresponding to the second coils 230.

The second coils 230 may be disposed so as to face the first magnets 130, which are secured to the housing 140. In one embodiment, the second coils 230 may be disposed outside the first magnets 130, or may be disposed under the first magnets 130 so as to be spaced apart from the first magnets 130 by a predetermined distance.

Although a total of four second coils 230 may be disposed one on each side of a circuit member 231 according to the embodiment, the disclosure is not limited thereto. Only two second coils 230, that is, one second coil for movement in the second direction and one second coil for movement in the third direction may be provided, or a total of more than four second coils 230 may be provided.

In the embodiment, although circuit patterns having the shape of the second coils 230 are formed on the circuit member 231 and additional second coils are disposed on the circuit board 231, the disclosure is not limited thereto. Alternatively, only additional second coils 230 may be disposed on the circuit member 231, without forming the circuit patterns having the shape of the second coils 230.

Furthermore, the second coils 230, which have been prepared by winding wires into a doughnut shape or which have the shape of a finely patterned coil, may be conductively connected to the printed circuit board 250.

The circuit member 231 including the second coils 230 may be disposed on the upper surface of the printed circuit board 250, which is positioned over the base 210. However, the disclosure is not limited thereto, and the second coils 230 may be disposed on the base 210 in a state of being in close contact therewith, or may be spaced apart from the base 210 by a predetermined distance. In other examples, a substrate on which the second coils are formed may be layered on the printed circuit board 250 and connected thereto.

The printed circuit board 250 may be conductively connected to at least one of the upper elastic member 150 and the lower elastic member 160, and may be coupled to the upper surface of the base 210. As shown in FIG. 2, the printed circuit board 250 may have through holes formed at positions corresponding to the support members 220, so as to allow the support members 220 to be fitted into the through holes.

The printed circuit board 250 may be provided with the terminal members 253, which are formed by bending portions of the printed circuit board 250. Referring to FIGS. 5 and 6, the printed circuit board 250 according to the embodiment includes two bent terminal members 253. Each terminal member 253 includes a plurality of terminals 251 for the application of external power to the terminal members 253, whereby current is supplied to the first coil 120 and the second coils 230. The number of terminals 251 provided on each terminal member 253 may be increased or decreased depending on the kinds of components to be controlled. Alternatively, the number of terminal members 253 provided on the printed circuit board may be one or three or more.

A cover member 300, which is configured to have an approximate box shape, may accommodate the movable unit, the second coil 230 and a portion of the printed circuit board 250, and may be coupled to the base 210. The cover member 300 may serve to protect the movable unit, the second coils 230, the printed circuit board 250 and the like, accommodated therein from damage, and may serve to prevent an electromagnetic field, which is generated by the first magnets 130, the first coil 120, the second coils 230 and the like, from leaking outward, thereby concentrating the electromagnetic field.

Second sensors 240 may be coupled to the base 210 so as to detect displacements of the housing 140 with respect to the base 210 in the second and/or third directions, perpendicular to the first direction. The second sensors 240 will now be described in detail with reference to FIG. 3.

A yoke 330 may be disposed on the base 210 in order to prevent the magnetic field generated by the first magnets 130 from leaking outward through the base 210 while concentrating the magnetic field. The yoke 330 will now be described in detail with reference to FIG. 3 or the like.

FIG. 3 is an exploded perspective view showing the disposition of the base 210, the yoke 330, the printed circuit board 250 and the second coils 230 of the lens moving apparatus according to the embodiment.

The base 210 may have the support recesses 256 formed in the outer lateral side surfaces thereof that face the terminals 251 of the printed circuit board 250. The support recesses 256 may be configured to have a uniform cross-section without a cutout portion 212 so as to support the terminal members 253 including the terminals 251.

As shown in FIG. 3, the base 210 may be provided with stepped portions 211 such that an adhesive is applied thereto when the cover member 300 is adhesively bonded. The stepped portions 211 may guide the cover member 300 coupled thereto, and may be coupled to the end of the cover member 300 in a surface-contact manner. The stepped portions 211 and the end of the cover member 300 may be adhesively and sealingly secured to each other by means of an adhesive or the like.

The second coils 230 may have first through holes 230a, which are formed through corner regions of the circuit member 231. The support members 220 may extend through the first through holes 230a and may be connected to the printed circuit board 250. The positions and the number of first through holes 230a may be determined in accordance with those of the support members 220.

In the embodiment, a total of eight support members 220 are symmetrically disposed two on the outer surface of each corner of the housing 140, and, correspondingly, a total of eight first through holes 230a are symmetrically disposed two on each corner of the second coils 230.

The support members 220 may be inserted into the respective first through holes 230a, and may be fixedly coupled to the second coils 230 by means of solder, a conductive adhesive or the like. The support members 220 may be fixedly coupled to the printed circuit board 250.

The printed circuit board 250 may have second through holes 250a, through which the respective support members 220 may extend. The support members 220 may be conductively connected to the printed circuit board 250 in such a manner that the support members 220 extend through the second through holes 250a in the printed circuit board 250 and are connected to a circuit pattern formed on the lower surface of the printed circuit board 250 through soldering or the like.

Like the first through holes 230a, the positions and the number of second through holes 250a may be determined in accordance with those of the support members 220. The support members 220 may also be fixedly coupled to the printed circuit board 250.

Since the support members 220 extend through the first through holes 230a and the second through holes 250a, the positions and the number of first through holes 230a may correspond to those of the second through holes 250a. Since a total of eight support members 220 are provided in the embodiment, a total of eight first through holes 230a and a total of eight second through holes 250a may be accordingly provided.

The printed circuit board 250 may be provided with second fitting holes 255. The second fitting holes 255 are the holes into which coupling protrusions 217 formed on the base 210 are fitted. The second fitting holes 255 may be disposed at positions corresponding to the coupling protrusions 217, and may be provided in the same number as the number of coupling protrusions 217. Since a total of four coupling protrusions 217 are provided in the embodiment, a total of four second fitting holes 255 may be correspondingly provided.

The coupling protrusions 217 fitted in the second fitting holes 255 may be coupled thereto by means of thermal fusion or an adhesive such as epoxy. Consequently, the printed circuit board 250 and the base 210 may be fixedly coupled to each other.

The yoke 330 may be provided with first fitting holes 331. The first fitting holes 331 are the holes into which the coupling protrusions 217 are fitted. Like the second fitting holes 255, the first fitting holes 331 may be disposed at positions corresponding to the coupling protrusions 217, and may have the same number as the number of coupling protrusions 217.

As in the case of the second fitting holes 255, the coupling protrusions 217 may be fitted into the first fitting holes 331 and may be coupled thereto by means of thermal fusion or an adhesive such as epoxy. Consequently, the yoke 330 and the base 210 may be fixedly coupled to each other.

Since the coupling protrusions formed on the base 210 are concurrently fitted into the first fitting holes 331 and the second fitting holes 255, the first fitting holes 331 and the second fitting holes 255 may be formed at positions corresponding to each other.

Furthermore, the first fitting holes 331 and the second fitting holes 255 may be formed at positions corresponding to the coupling protrusions 217, and may be provided in the same number as the number of coupling protrusions 217. Since a total of four coupling protrusions 217 are provided in the embodiment, a total of four first fitting holes 331 and a total of four second fitting holes 255 may be provided.

The base 210 and the yoke 330 may be formed integrally with each other through a molding process such as insert injection. In this case, the printed circuit board 250 may be coupled to the base 210 by virtue of fitting of the coupling protrusions 217 into the second fitting holes 255.

In the embodiment, the yoke 330 may be disposed between the printed circuit board 250 and the base 210 so as to prevent a magnetic field generated by the first magnet 110 from leaking outward through the base 210 to thus concentrate the magnetic field.

In the embodiment, the yoke 330 may be embodied as a plate shape including a hole. The remaining portion of the yoke 330 excluding the center hole may be configured to face the first magnet 110.

The yoke 330 may be made of, for example, steel material, preferably SPC material. Since the surface of the yoke 330, which is made of steel material, may oxidize or corrode, there is a need for treatment for preventing corrosion of the surface of the yoke 330. Accordingly, the surface of the yoke 330 may be coated with, for example, a corrosion-resistant plating layer.

The yoke 330 may be made of, for example, SUS, that is, stainless steel, and preferably SUS containing Fe of 50% or more. Since SUS material is highly resistant to oxidation or corrosion, the surface of the yoke 330 needs not be subjected to an additional treatment such as coating of a corrosion-resistant plating layer.

The second sensors 240 may detect displacement of the housing 140 with respect to the base in the second and/or third directions, perpendicular to the first direction. To this end, the second sensors 240 may be disposed close to the second coils 230 with the printed circuit board 250 disposed therebetween so as to detect movement of the housing 140.

Although the second sensors 240 are disposed at ends of the second coils 230 when viewed in the first direction in the embodiment, the disclosure is not limited thereto. In other words, the second sensors 240 may be disposed at the centers of the second coils 230. Alternatively, the second sensors 240 may be disposed so as not to overlap the second coils 230 when viewed in the first direction.

The second sensors 240 are not directly connected to the second coils 230. The second coils 230 may be disposed on the upper surface of the printed circuit board 250, and the second sensors 240 may be disposed on the lower surface of the printed circuit board 250. According to the embodiment, the second sensors 240, the second coils 230 and the first magnets 130 may be disposed coaxially in the first direction.

The second sensors 240 may be embodied as sensors for detecting variation in magnetic force generated by the first magnet 110. The second sensors 240 may be embodied as Hall sensors, or may be embodied as any sensor capable of detecting variation in magnetic force. As shown in FIG. 3, a total of two second sensors 240 may be provided at two sides of the base 210, which is disposed under the printed circuit board 250, and the second sensors 240 may be mounted in mounting recesses 215 formed in the base 210.

One of two second sensors 240 serves to detect displacement of the housing 140 with respect to the base 210 in the second direction, and the other of two sensors 240 serves to detect displacement of the housing 140 with respect to the base 210 in the third direction.

Assuming that imaginary lines extend from the centers of the two second sensors 240 in the second and third direction, respectively, the two second sensors 240 may be positioned such that the respective imaginary lines are perpendicular to each other.

In the embodiment, a total of four second coils 230 may be provided such that respective second coils 230 face each other in pairs, and the two second sensors 240 may be disposed near one of two second coils 230 that face each other.

The upper surface of the base 210 may be provided with the mounting recesses 215 in which the second sensors 240 are mounted. According to the embodiment, the two second sensors 240 are respectively mounted in the two mounting recesses 215 so as to detect displacement by which the housing 140 moves in the second and third directions.

To this end, assuming that imaginary lines extend from the two mounting recesses 215 in the second and third directions, the mounting recesses 215 may be positioned such that the two imaginary lines are perpendicular to each other.

Unlike the embodiment shown in FIG. 3, the positions of the two mounting recesses 215 may vary in the second or third direction in accordance with the disposition of the second sensors 240 relative to the second coils 230.

The base 210 may be provided at the corners thereof with the respective cutout portions 212. The cover member 300 may project at the corners thereof in the first direction. In this case, the projections of the cover member 300 may engage with the cutout portions 212 of the base 210.

FIG. 4 is a perspective view showing a portion of the lens moving apparatus according to the embodiment. FIG. 5 is a side elevation view of FIG. 4. FIG. 6 is a side elevation view of FIG. 5, from which the base 210 is removed.

As shown in FIG. 4, a total of four first magnets 130 may be oriented such that the longitudinal direction of a pair of first magnets 130 is oriented in the second direction and the longitudinal direction of the other pair of first magnets 130 is oriented in the third direction.

Accordingly, a total of four second coils 230 may be provided such that the four second coils 230 have positions and shapes corresponding to the four respective first magnets 130. Here, the second coils 230 and the first magnets 130 may be disposed such that the upper surfaces of the second coils 230 are spaced apart from the lower surfaces of the first magnets 130 by a predetermined distance, as described above.

The printed circuit board 250 may be disposed under the second coils 230 so as to be in a close contact therewith, and may be fixedly coupled to the base 210.

Referring again to FIG. 1, the magnetic field that is generated by the first magnets 130 and leaks in the upward direction of the base 210, may be blocked by the cover member 300, and the magnetic field that is generated by the first magnets 130 and leaks in the downward direction of the base 210 may be blocked by the yoke 330.

In other words, the yoke 330 may be disposed between the base 210 and the first magnets 130 so as to block some of a the magnetic field that is generated by the first magnet 130 and leaks in the downward direction of the base 210.

According to the embodiment, since the magnetic field that is generated by the first magnets 130 and leaks outward, may be blocked by the yoke 330, the magnetic field is concentrated on the second coils 230, thereby increasing the magnetic force acting on the second coils 230.

Furthermore, the increased magnetic force may contribute to an increase in driving force required for handshake correction, and the increased driving force may in turn increase the elastic modulus of the support members 220. The increased elastic modulus may increase the resonant frequency of the support members 220, and the increased resonant frequency may in turn enable the creation of a design that avoids resonance and control of driving of handshake correction.

FIG. 7 is a bottom view showing a portion of the lens moving apparatus according to an embodiment of the present invention. FIG. 8 is a bottom view showing the yoke 330 according to an embodiment of the present invention.

The yoke 330 may be provided at the corners thereof with cutout portions 333. The cutout portions 330 may be formed in the yoke 330 so as to prevent the support members 220, which are fitted into the first through holes 230a and the second through holes 250a, and the coupling protrusions, which are formed on the base 210 from interfering with the yoke 330.

As shown in FIG. 7, since the support members 220 are fitted into the second through holes 250a formed in the corners of the printed circuit board 250 in the embodiment, the cutout portions 333 of the yoke 330 may be formed in the corners of the yoke 333 so as to avoid the second through holes 250a.

The yoke 330 may have interference-avoiding cutout portions 332. The interference-avoiding cutout portions 332 may be provided at positions corresponding to the second sensors 240 so as to avoid interference with the second sensors 240.

According to the embodiment, since the second sensors 240 serve to measure displacement in the second and third directions of the housing 140 by detecting variation in magnetic force in the second and third directions of the first magnets 130, the second sensors 240 are required to be disposed such that the magnetic field generated by the first magnet 130 is not intercepted by the yoke 330.

Accordingly, the yoke 330 has to be disposed such that the second sensors 240, which are provided at positions corresponding to the first magnets 130, are able to detect the magnetic field generated by the first magnet 130 without intercepting the magnetic field when viewed in the first direction. To this end, the yoke 330 is provided with the interference-avoiding cutout portions 332.

The interference-avoiding cutout portions 332 may be formed in the yoke at positions corresponding to the second sensor 240. In the embodiment, the second sensors 240 are disposed near the corners of the printed circuit board 250. Accordingly, the interference-avoiding cutout portions 332 may be formed near the corners of the yoke 330 in accordance with the positions of the second sensors 240.

In the case in which the second sensors 240 are disposed near the centers of respective sides of the printed circuit board 250, the interference-avoiding cutout portions 332 may be formed near the centers of respective sides of the yoke 330.

FIG. 9 is a perspective view showing the first magnets 130 and the yoke 330, which are configured according to an embodiment of the present invention. In the embodiment, the yoke 330 may be disposed to face the first magnets 130.

Specifically, a total of four first magnets 130 may be disposed so as to overlap the yoke 330 when viewed in the first direction. However, the first magnets 130 may not overlap the yoke 330 at the area in which the interference-avoiding cutout portions 332 are formed.

Since the yoke 330 is disposed between the first magnet 130 and the base 210, it is possible to prevent the magnetic field generated by the first magnets 130 from leaking in the downward direction of the base 210.

The shape of the yoke 330 may vary to some degree in accordance with the shape and positions of the first magnets 130, the shape and positions of the support members 220, or the like. For example, the first magnets 130 may be configured to have a trapezoidal shape rather than the bar shape as in the embodiment, and may be disposed near the corners of the yoke 330. Furthermore, the support members 220 may be constituted by leaf springs, and may be disposed near respective sides of the yoke 330.

The yoke 330 may be configured to have an appropriate shape in accordance with the circumstances as noted above. However, considering the efficiency with which the magnetic field is blocked, the yoke 330 is preferably disposed so as to overlap the first magnets 130 over as large an area as possible when viewed in the first direction.

FIG. 10 is an exploded perspective view showing disposition of the base 210, the yoke 330, the printed circuit board 250 and the second coils 230 of the lens moving apparatus according to another embodiment of the present invention.

As shown in FIG. 10, the lens moving apparatus according to another embodiment may be constructed such that the yoke 330 is disposed between the second coils 230 and the printed circuit board 250. In the embodiment, since the specific structures of the base 210, the yoke 330, the printed circuit board 250 and the second coils 230 are the same as or very similar to those in the preceding embodiment, shown in FIG. 2, detailed descriptions thereof are omitted.

In the embodiment shown in FIG. 10, since the printed circuit board 250 is disposed under the yoke 330, the magnetic field generated by the first magnets 130 is blocked by the yoke 330, whereby the printed circuit board 250 may be only very slightly affected by the magnetic force generated by the first magnets 130.

Accordingly, since the printed circuit board 250 is not affected much by magnetic force in this embodiment, it is possible to reduce the occurrence of malfunctions of elements incorporated in the printed circuit board 250 and prevent a decrease in performance.

FIG. 11 is a graph illustrating the operating characteristics of the lens moving apparatus according to the embodiment. Specifically, FIG. 11 illustrates the characteristics of handshake correction of the lens moving apparatus. In the graph, the vertical axis represents displacement of the housing 140 in the second or third direction with respect to the base 210, and the horizontal axis represents the amount of current applied to the second coils 230.

Furthermore, A and B in the graph represent variation in displacement caused by variation of current. A in the graph designates the case in which the yoke 330 is not provided, and B designates the case in which the yoke 330 is provided.

As is appreciated from the graph, A has a steeper slope than B. This means that variation is greatly increased even by a small amount of current in the case in which the yoke 330 is provided, compared to the case in which the yoke 330 is not provided. Accordingly, the presence of the yoke 330 enables the bobbin 110 to move in the second and/or third direction within a larger range, even using a small amount of current.

Accordingly, by virtue of the provision of the yoke 330, the lens moving apparatus according to the embodiment may use a smaller amount of current during handshake correction.

Furthermore, the provision of the yoke 330 may allow the elastic modulus of the support members 220 to be increased, and the increase in the cross-sectional area of the support members 220 may also allow the elastic modulus of the support members 220 to be increased. Ultimately, the provision of the yoke 330 may allow the cross-sectional area of the support members 220 to be increased, and the increase in the cross-sectional area of the support members 220 has the effect of increasing the mechanical stability of the support members 220 and respective components to which the support members 220 are coupled.

In addition, when the yoke 330 is provided, as in the embodiments illustrated in FIGS. 3 and 10, it is possible to alleviate impacts which are applied to the base 210. Specifically, when projecting portions such as protrusions of the housing 140 or the bobbin 110 collide with the yoke 330, impacts applied to the base 210 are alleviated, compared to the case in which the projecting portions directly collide with the base 210 due to the absence of the yoke 330, thereby remarkably reducing deformation caused by collisions with the base 210 and preventing breakage of an ultraviolet filter (not shown), which may be mounted on the base 210.

The lens moving apparatus according to this embodiment may be incorporated in devices in various fields, for example, a camera module. Such a camera module may be applied to mobile devices such as cellular phones.

The camera module according to this embodiment may include the lens barrel coupled to the bobbin 110, an image sensor (not shown), a printed circuit board 250, and an optical system.

The lens barrel may be constructed as described above, and the circuit board 250 may constitute the bottom surface of the camera module, starting from the area on which the image sensor is mounted.

The optical system may include at least one lens for transmitting images to the image sensor. The optical system may be provided with an actuator module capable of fulfilling autofocusing and optical image stabilizing functions. The actuator module for fulfilling the autofocusing function may be constructed in various fashions, but mainly adopts a voice coil unit motor. The lens moving apparatus according to this embodiment may serve as an actuator module for fulfilling both autofocusing and optical image stabilizing functions.

The camera module may further include an infrared ray screening filter (not shown). The infrared ray screening filter serves to shield the image sensor from light in the infrared range. In this case, the base 210, which is illustrated in FIG. 2, may be provided with the infrared ray screening filter at a position corresponding to the image sensor, and the infrared ray screening filter may be coupled to the base 210 by means of a holder member (not shown). Furthermore, the base 210 may support the lower portion of the holder member.

The base 210 may be provided with an additional terminal member for connection with the circuit board 250, and the terminal member may be integrally formed using a surface electrode. The base 210 may serve as a sensor holder for protecting the image sensor. In this case, although the base 210 may be provided along the lateral side surface thereof with protrusions projecting downward, these are not essential components. Although not shown in the drawings, an additional sensor holder disposed under the base 210 may fulfill the function of the protrusions.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
   a housing;
   a bobbin disposed in the housing and configured to move in a first direction;
   a first coil disposed on the bobbin;
   a first magnet disposed on the housing and facing the first coil;
   a second coil disposed below the housing and facing the first magnet;
   a yoke disposed below the second coil;
   a printed circuit board disposed below the yoke; and
   a base disposed below the printed circuit board;
   wherein the yoke is disposed below the first magnet,
   wherein the yoke comprises a first portion overlapped with the first magnet in the first direction,
   wherein the first portion of the yoke blocks a leak of a magnetic field of the first magnet in a down direction, and the down direction is parallel to the first direction and is a direction from the first portion of the yoke to a first portion of the printed circuit board corresponding to the first portion of the yoke; and
   wherein an upper surface of the first portion of the yoke contacts a lower surface of the second coil, and a lower surface of the first portion of the yoke contacts an upper surface of the printed circuit board.

2. The lens moving apparatus according to claim 1, wherein the yoke is configured to have a plate shape including a hole and to face the first magnet.

3. The lens moving apparatus according to claim 1, wherein the base includes at least one coupling protrusion formed on an upper surface thereof, and
   wherein the yoke and the printed circuit board are coupled with the at least one coupling protrusion of the base.

4. The lens moving apparatus according to claim 3, wherein the yoke has a first hole coupled with the at least one coupling protrusion.

5. The lens moving apparatus according to claim 4, wherein the printed circuit board has a second hole coupled with the at least one coupling protrusion.

6. The lens moving apparatus according to claim 5, wherein the first hole and the second hole are formed at positions corresponding to each other.

7. The lens moving apparatus according to claim 6, wherein the first hole and the second hole are formed at positions corresponding to the at least one coupling protrusion, and a number of each of the first hole and the second hole is the same as a number of the at least one coupling protrusion.

8. The lens moving apparatus according to claim 1, further comprising a sensor disposed on the base so as to detect displacement of the housing in second and third directions, perpendicular to the first direction.

9. The lens moving apparatus according to claim 8, wherein the base has a mounting recess, and
   wherein the sensor is coupled with a lower surface of the printed circuit board and disposed on the mounting recess.

10. The lens moving apparatus according to claim 9, wherein the sensor includes a first sensor and a second sensor, wherein the first sensor serves to detect displacement in the second direction of the housing with respect to the base, and the second sensor serves to detect displacement in the third direction of the housing with respect to the base.

11. The lens moving apparatus according to claim 10, wherein the first sensor and the second sensor are oriented such that an imaginary line extending from the center of the first sensor in the second direction and an imaginary line extending from the center of the second sensor in the third direction are perpendicular to each other.

12. The lens moving apparatus according to claim 11, wherein the second coil includes four second coils,
   wherein two of the second coils face each other and a remaining two of the second coils face each other, and
   wherein the first sensor is disposed near one of the two of the second coils and the second sensor is disposed near one of the remaining two of the second coils.

13. The lens moving apparatus according to claim 12, wherein the yoke has a cutout portion formed at a position corresponding to the sensor such that the yoke is not overlapped with the sensor in the first direction.

14. The lens moving apparatus according to claim 13, wherein the cutout portion is formed from an edge of the yoke.

15. The lens moving apparatus according to claim 10,
   wherein the base comprises four corners including a first corner, a second corner, a third corner opposite to the first corner, and a fourth corner opposite to the second corner;
   wherein the first sensor is disposed near the first corner of the base, and the second sensor is disposed near the second corner of the base.

16. The lens moving apparatus according to claim 1, wherein the yoke is made of steel.

17. The lens moving apparatus according to claim 6, wherein the yoke comprises a corrosion-resistant plating layer.

18. A lens moving apparatus comprising:
   a housing;
   a bobbin disposed in the housing and configured to move in a first direction;
   a first coil disposed on the bobbin;
   a first magnet disposed on the housing and facing the first coil;
   a second coil disposed below the housing and facing the first magnet;
   a printed circuit board disposed below the second coil;

a position sensor coupled to the printed circuit board so as to detect displacement of the housing in second and third directions perpendicular to the first direction;

a base disposed below the printed circuit board; and a yoke disposed between the second coil and the printed circuit board, wherein the yoke is disposed below the first magnet, wherein the yoke comprises a first portion overlapped with the first magnet in the first direction, wherein the first portion of the yoke blocks a leak of a magnetic field of the first magnet in a down direction, and the down direction is parallel to the first direction and is a direction from the first portion of the yoke to a first portion of the printed circuit board corresponding to the first portion of the yoke; and wherein an upper surface of the first portion of the yoke contacts a lower surface of the second coil, and a lower surface of first portion of the yoke contacts an upper surface of the printed circuit board.

19. The lens moving apparatus according to claim 18, wherein the position sensor includes a first sensor and a second sensor, wherein the base comprises four corners including a first corner, a second corner, a third corner opposite to the first corner, and a fourth corner opposite to the second corner;

wherein the first sensor is disposed near the first corner of the base, and the second sensor is disposed near the second corner of the base;

wherein the yoke has a cutout portion formed at a position corresponding to the position sensor such that the yoke is not overlapped with the position sensor in the first direction, and wherein the cutout portion is formed from an edge of the yoke.

* * * * *